(12) United States Patent
Crossman

(10) Patent No.: US 7,798,282 B2
(45) Date of Patent: Sep. 21, 2010

(54) POWER ASSISTED STEERING SYSTEM

(75) Inventor: John C. Crossman, Rockwood, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 245 days.

(21) Appl. No.: 12/041,688

(22) Filed: Mar. 4, 2008

(65) Prior Publication Data
US 2009/0223737 A1 Sep. 10, 2009

(51) Int. Cl.
*B62D 5/06* (2006.01)

(52) U.S. Cl. .................. 180/422; 180/417; 180/421; 417/213; 417/410.3; 417/210; 417/310; 417/293

(58) Field of Classification Search ............. 180/422, 180/417, 421; 417/213, 410.3, 210, 310, 417/293
See application file for complete search history.

(56) References Cited

U.S. PATENT DOCUMENTS

| | | | |
|---|---|---|---|
| 4,700,794 A | 10/1987 | Bernhagen et al. | |
| 4,955,442 A | 9/1990 | Crabb et al. | |
| 5,936,379 A * | 8/1999 | Matsuoka | 318/810 |
| 5,979,504 A | 11/1999 | Spivey et al. | |
| 6,041,883 A | 3/2000 | Yokota et al. | |
| 6,119,061 A | 9/2000 | Schenkel et al. | |
| 6,122,912 A | 9/2000 | Phillips | |
| 6,152,254 A * | 11/2000 | Phillips | 180/422 |
| 6,158,544 A | 12/2000 | Dvorak et al. | |
| 6,217,296 B1 * | 4/2001 | Miyazawa et al. | 417/310 |
| 6,390,228 B2 * | 5/2002 | Serizawa et al. | 180/403 |
| 6,419,042 B1 | 7/2002 | Stenstrom | |
| 6,524,076 B2 | 2/2003 | Konishi | |
| 6,736,604 B2 | 5/2004 | Okada et al. | |
| 6,929,086 B1 | 8/2005 | Husain et al. | |
| 6,945,352 B2 | 9/2005 | Phillips | |
| 6,976,555 B2 | 12/2005 | Husain et al. | |
| 2005/0129528 A1 * | 6/2005 | Hunter et al. | 417/199.1 |
| 2006/0024179 A1 * | 2/2006 | Schmidt | 417/410.3 |

* cited by examiner

*Primary Examiner*—Lesley Morris
*Assistant Examiner*—Marlon A Arce
(74) *Attorney, Agent, or Firm*—Raymond L. Coppiellie

(57) ABSTRACT

A hybrid electrical power assist system (EPAS) for an automotive vehicle that utilizes the advantages of a conventional EPAS system to provide power assist based upon several distinct sensor inputs, in a heavy duty vehicle that requires significantly more assistance forces than a conventional EPAS can provide. The hybrid system utilizes a hydraulic amplifier that is connected to receive the torque output from an EPAS motor actuator and responsively provide a fluid under differential pressure through a pair of high pressure lines to a steering piston.

15 Claims, 3 Drawing Sheets

POWER ASSISTED STEERING SYSTEM

BACKGROUND

1. Field of the Invention

This invention relates to the field of electrical power assist steering systems for automotive vehicles and more specifically to the area of increasing the output of such systems to enable them to be used in heavy duty vehicles.

2. Description of the Prior Art

Generally, power assisted steering systems for automotive vehicles are classified as either hydraulic power assisted steering ("HPAS") or electrical power assisted steering ("EPAS"). A pure HPAS system is the type in which a fixed displacement hydraulic pump is directly driven from the vehicle engine to supply pressurized fluid through a hydromechanical control valve to a steering gear where the pressure is differentially applied to a piston or other steering actuator mechanism on the steering gear. A pure EPAS system is the type in which an electrically powered motor is controlled by sensor reactive circuitry to apply assisting torque directly to the steering gear or other steering actuator mechanism. All control to the steering gear in a pure EPAS system is electro-mechanical in nature and no hydraulic systems are involved. EPAS systems generally provide for a greater use of sensors throughout the vehicle and allow steering assist to be adjusted in accordance with driver input through the steering wheel and other factors, such as speed of the vehicle, rate of steering wheel torque and many other variables that were not available in pure HPAS systems.

FIG. 1 illustrates a block diagram of a typical prior art EPAS system as employed in an automotive vehicle. In such a system, a control module 100 contains an electrical controller 110 which feeds an output control signal to a power electronics module 120, which, in turn, supplies electrical power on line 140 to an actuating torque motor 150. Torque motor 150 contains a gear 160 on its output shaft which is engaged directly or through a gear mechanism with a steering gear 212 within a rack housing 210. In this depiction, the driver input is represented as a steering wheel 250. A torque transducer 240 is located on the steering wheel shaft to provide informational data to the controller 110. Such informational data includes the torque being applied by the driver to the steering wheel. Also, it may sense the position of the steering wheel as well as its distance from center. Steered vehicle wheels are represented as output mass 260 connected to steering gear 212. Controller 110 is connected to receive input data from the vehicle such as vehicle speed, steering wheel position and steering wheel input torque. Based upon such data, controller 110 utilizes an algorithm to determine how much assistance torque to apply to the steering gear 212 through torque motor 150 and its gear 160.

It is highly desired to employ EPAS systems in heavy duty vehicles. However, when using EPAS systems with a conventional 12 volt DC electrical power system, there are practical limitations that must be overcome or accommodated. Due to the larger steering loads encountered by placing such systems in heavier vehicles, there would be a requirement for higher capacity power electronics and larger motor components. The increased cost of these components makes EPAS systems uncompetitive with HPAS systems in high load applications. Even when cost is ignored, the maximum current available from the vehicle electrical system is a real-life barrier to implementation. As a practical alternative, several variations of hybrid systems have been developed in which a hydraulic-mechanical link of an HPAS system is maintained, to some degree, while one or more control functions applied to a hydraulic assist are electrically controlled to provide greater response to various vehicle data.

There continues to be a need for an improved EPAS system or some version of a hybrid EPAS system in which steering assist could be applied to heavy duty vehicles, while minimizing the detrimental effects of the system on the operating efficiencies of the vehicle.

SUMMARY OF THE INVENTION

The present invention is directed to a hybrid EPAS system that applies a hydraulically amplified steering assist fluid under differential pressure to the steering gear of a vehicle. The hydraulically amplified steering assist is controlled in response to the torque output produced by a conventional EPAS actuator motor and a controller which responds to electrical sensors providing vehicle data useful to provide enhanced steering control.

In the described embodiment, an over-center variable displacement pump is utilized as the hydraulic amplifier. The over-center variable displacement pump has a pair of pump chamber output ports that are connected to either side of a steering gear piston chamber to provide fluid under differential pressure to the piston and assist in moving the steering gear. The over-center variable displacement pump also has an adjustable ring cam which, with a fixed center vane rotor, defines a variable pump chamber to determine the differential pressure output via the pump chamber output ports. Depending on the adjustment of the ring cam, the fluid at one port will have a higher pressure than the fluid at the other port. If no adjustment is made to the ring cam, it is biased to assume a neutral position and no differential pressure is present at the pump chamber output ports. When adjusted between its extreme locations, the ring cam controls the pump to vary the output pressure differential that is applied to the steering gear. The amount of torque required to adjust the ring cam by the EPAS motor is significantly less than the amount of differential pressure output from the over-center variable displacement pump, thereby resulting in the desired force amplification.

A fixed displacement hydraulic pump is used to supply fluid to the variable displacement pump under relatively low pressure. The fixed displacement pump provides make-up fluid to replace any losses that occur between the internal chambers, seals and passages of the variable displacement pump and the fluid reservoir. By providing such make-up fluid, cavitation is prevented from occurring in the variable displacement pump. For efficiency of construction, space, and future service, the rotors of both pumps are preferable mounted on a common shaft connected to a common accessory drive on the engine of the vehicle. Alternatively, separated drives could be applied to the pumps, if so desired.

It is an object to the present invention to provide a power steering assist system which includes a variable displacement hydraulic pump having a pair of pump chamber output ports connected to provide differentially pressurized fluid to a steering gear apparatus; a control circuit which reacts to vehicle driver input and other vehicle data to provide an electrical signal to actuate a torque motor; the torque motor reacting to the electrical signal to adjust the displacement characteristics of the variable displacement hydraulic pump; and the first variable displacement pump reacting to the adjusted displacement characteristics to provide differentially pressurized fluid to the steering gear apparatus.

It is another object of the present invention to provide a second hydraulic pump of lesser output capacity than the first pump to act as the source of fluid to the variable displacement pump.

It is a further object of the present invention to provide a method of controlling the differential pressure of hydraulic fluid applied to the steering gear of a steering assist system in an automotive vehicle by utilizing the steps of providing hydraulic fluid output from an over-center variable displacement hydraulic pump, having a movable cam, through a pair of outlet lines to opposing sides of the steering gear; providing hydraulic fluid under differential pressure to the steering gear; controlling the differential pressure output from the over-center variable displacement hydraulic pump with a an electrically actuated torque motor which adjusts the movable cam; deriving data from the vehicle; and actuating the torque motor in response to the data to provide the desired differential pressure to the steering gear.

It is still a further object of the present invention to provide a power assist steering system which utilizes a fixed displacement pump in tandem and on a common shaft with an over-center variable displacement pump. The two pumps are commonly driven by the same engine of an automotive vehicle. The fixed displacement pump provides relatively low pressure to said variable displacement pump. The variable displacement pump contains a ring cam that is infinitely adjustable between two extreme positions about a relatively fixed center vane rotor to change the pump chamber configuration and the differential pressure characteristics of the pump output. An EPAS controller and electrically driven torque motor provide adjustment control to the ring cam to position the ring cam with respect to the pump vane rotor and, therefore, the differential pressure output by the variable displacement pump to the steering gear.

Advantages include:
a) the utilization of a gearing mechanism to convert electrical motor torque to a force that is amplified by a hydraulic pump;
b) the utilization of a an over-center variable displacement pump to amplify and provide a differential pressure having a magnitude and flow to the steering gear piston that is a function of torque applied by the electric motor;
c) a feedback mechanism in the over-center variable displacement pump to resist cam displacement caused by torque from the electric motor, and to balance the cam in a neutral position the event of electrical system failure;
d) allowing for a single pump assembly which contains two pumps which share a common shaft; and
e) utilizing a smaller second pump to provide fluid supply to the larger over-center variable displacement pump to compensate for internal leakage and to pressurize the larger pump to prevent cavitation.

DETAILED DESCRIPTION

Figure 1:
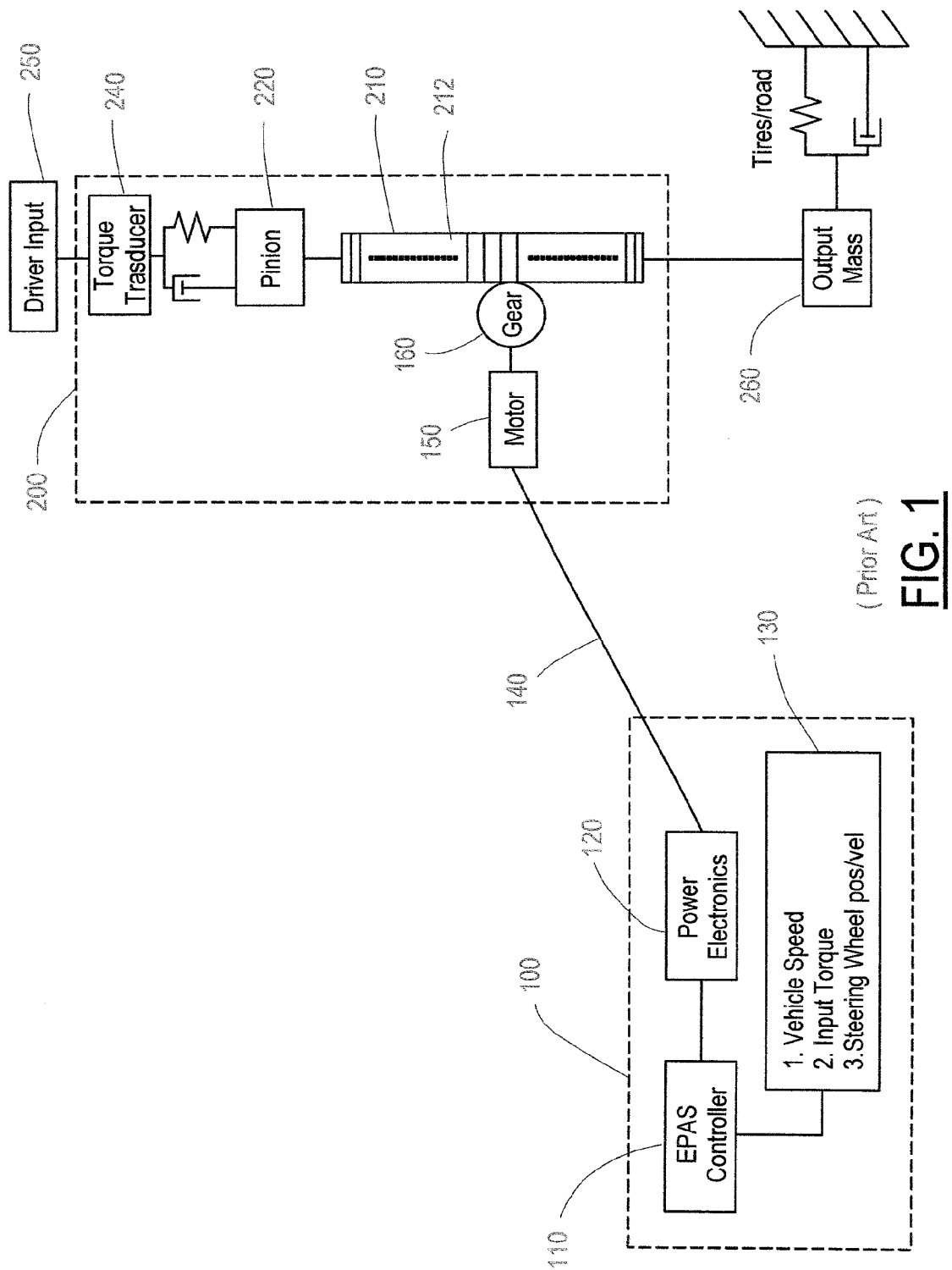
FIG. 1 is a schematic of a typical prior art EPAS system.
Figure 2:
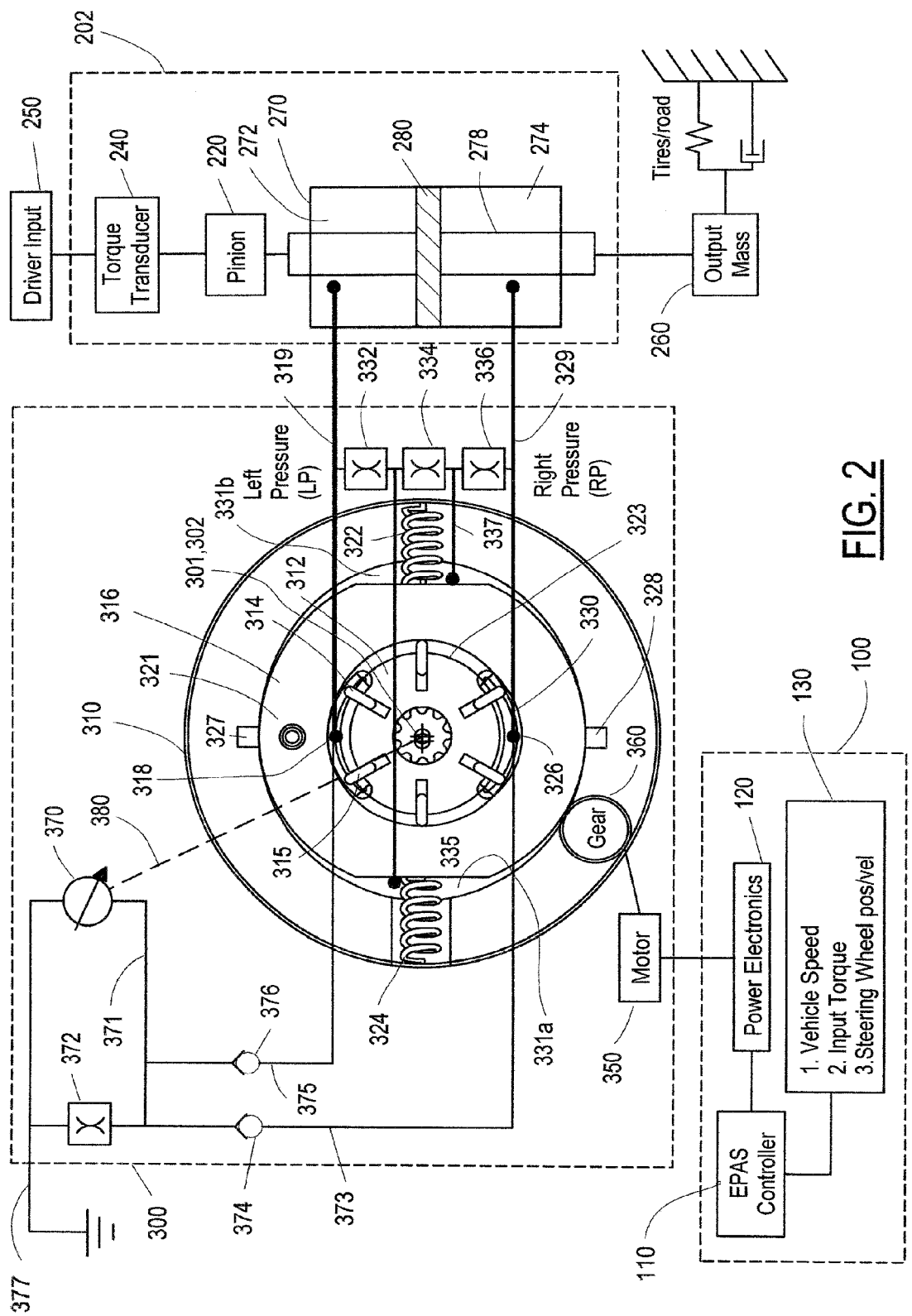
FIG. 2 is a schematic of an embodiment of the present invention.

In FIG. 2, a preferred embodiment of the invention is shown in which a conventional EPAS type controller module 100 is connected to a torque motor 350 connected to a hydraulic amplifier 300. The amplifier 300 provides a fluid under differential pressure on output lines 319 and 329 to a steering apparatus 202. Steering apparatus 202 contains a steering rack 278 within a housing 270. Linear movement of the steering rack 278 along its length provides the forces necessary to affect directional steering of the vehicle wheels represented as output mass 260. Steering gear 278 has a piston 280 mounted thereon and defines separate steering actuation chambers 272 and 274. Differential pressure of fluid output from amplifier 300 applied to actuation chambers 272 and 274 on either side of the piston acts to assist the driving forces applied to steering rack 278 by the vehicle operator ("driver") input in the form of a steering wheel 250, or the like. Steering wheel 250 is connected to rotate a pinion gear 220; and a torque sensor 240 monitors the amount of torque applied to pinion gear 220 by steering wheel 250.

Controller module 100 contains an EPAS control circuit 110 which receives vehicle input data 130, including vehicle speed, steering wheel input torque, steering wheel position and turning velocity. Control circuit 110 is programmed with an algorithm to provide a predetermined output signal to a power electronics driver 120 where it is stepped up to drive torque motor 350 with a current sufficient to provide a predetermined measure of rotational torque force output. The output of the motor 350 is directly connected to a reduction gear mechanism 360.

The heart of hydraulic amplifier 300, in this embodiment, is the over-center variable displacement hydraulic pump 310. While the rotor 312 is relatively fixed about its rotation center 321 (see FIGS. 3A-3C), its pump chamber 323 is subject to change in configuration. A ring cam 316 is mounted within a cam control chamber 331 which is shown as separate chambers 331a and 331b. Rotor 312 has a plurality of vanes 314 slideably mounted in corresponding slots 315 distributed evenly about its outer periphery. When rotor 312 is rotationally driven, vanes 314 slide outward due to centrifugal forces to engage the inner circular wall surface of ring cam 316. Ring cam 316 is mounted to be moved within the limits of the cam chamber 331 about a pivot pin 321. Seals 327 and 328 provide separation of pressure to the left and right of cam control chambers 331a and 331b while allowing ring cam 316 to be moved about pivot pin 321. Ring cam 316 has a central void which, along with the outer periphery of pump rotor 312, forms the variable pump chamber 323. In this embodiment, the central void of ring cam 316 is a circular space and is shown in FIG. 2 as being concentric with pump rotor 312. That is, the center 302 of ring cam 31 6 lies on center 301 of pump rotor 312, when the pressures applied to outer wall surface of ring cam 316 are in balance. Balancing springs 322 and 324 are located on opposite sides of ring cam 316, and function to bias ring cam 316 towards the concentric configuration noted above.

Pump 310 has a pair of outlet ports 318 and 326 on opposite sides of variable pump chamber 323. High pressure output lines 319 and 329 lead directly from outlet ports 318 and 326 to actuation chambers 272 and 274, respectively. Rack gear 278 is responsive to applied driver input pressure from pinion gear 220, and is assisted by the differential pressure output from pump 310 applied to actuation chambers 272 and 274 acting on piston 280. Feedback orifices 332, 334 and 336 are provided between output lines 319 and 329 to present reduced but corresponding pressures to cam control chambers 331a and 331b via feedback lines 335 and 337, respectively.

A second pump 370 is of a fixed displacement variety and has a relatively low pressure capability, as compared to the variable displacement pump 310. Pump 370 serves to provide make-up pressure to the variable displacement pump 310 and thereby prevent cavitation that may otherwise occur due to leakage within and among the various pump cavities. For convenience in packaging and service, the two pumps are mounted to have a common shaft 380 that interconnects and rotationally drives their respective rotors. Shaft 380 is driven as an accessory of the associated vehicle engine in a conventional manner, such as by a continuous belt or a gear system (not shown). Alternatively, if employed in a hybrid or an electric motor driven vehicle, the pumps could be driven by an auxiliary power source.

Pump 370 is connected to draw fluid from a reservoir on input line 377 and provide fluid under a relatively low pressure that varies with the speed of the engine on output line 371. The output pressure is equally provided to check valves 374 and 376. From the check valves 374 and 376, the fluid is supplied as make-up fluid to both sides of pump chamber 323 via lines 373 and 375. Control orifice 372 is provided between the inlet and outlet of pump 370 to provide backpressure on the inlet of the variable displacement pump.

In operation, as control module 100 reacts to the need to provide steering assist, motor 350 is energized with a predetermined amount of current to cause a predetermined torque to be generated to the left or right, as appropriate. This torque is applied to gear 360. Gear 360 responsively rotates against ring cam 316 to force it over center with respect to the relatively stationary rotor center 301. Movement of ring cam 316 is limited by various factors, including the amount of pressure existing in the cam control chambers 331a and 331b due to pressure feedback from lines 335 and 337 as well as springs 324 and 322 all acting to counterbalance the torque pressure presented via gear 360.

Figure 3C:
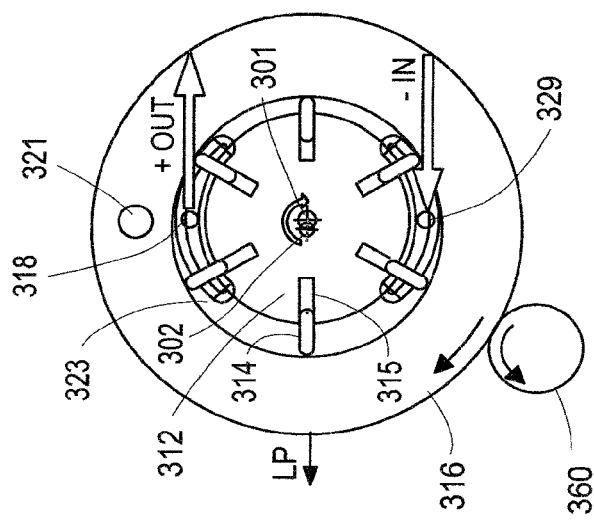
FIG. 3C is a representation of an over-center variable displacement pump in which torque is applied to position the ring cam to the left.
Figure 3B:
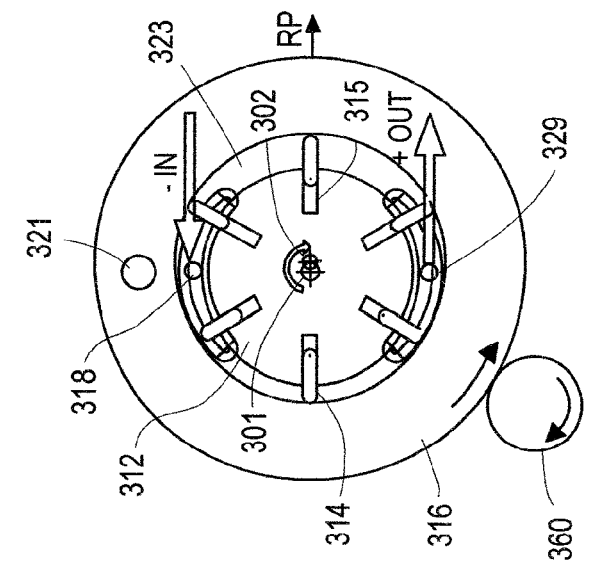
FIG. 3B is a representation of an over-center variable displacement pump in which torque is applied to position the ring cam to the right.
Figure 3A:
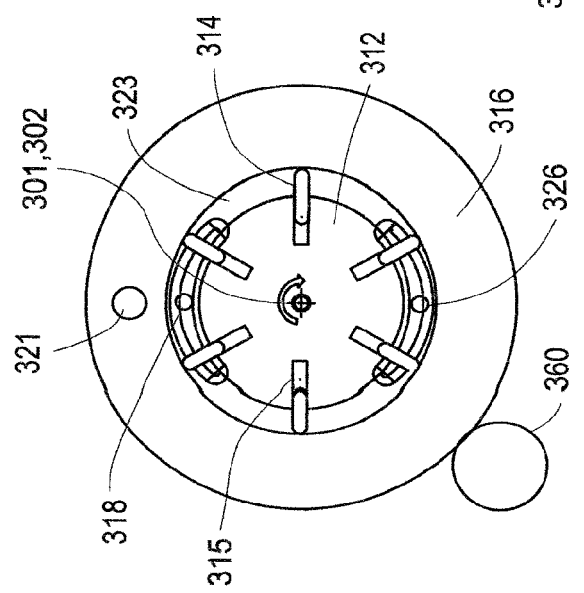
FIG. 3A is a representation of an over-center variable displacement pump in which no torque is applied to the ring cam.

As can seen in the simplified and exaggerated depictions in FIGS. 3A, 3B and 3C, the operation of the over-center variable displacement pump 310 functions to apply a differential pressure at its output ports 318 and 326 according to the position of ring cam 316.

In FIG. 3A, ring cam 316 is shown in its center position, as it is also shown in FIG. 2. In this center position, the center 302 of the ring cam 316 and center 301 of pump rotor 312 are concentric and the pump chamber 323 is symmetric. In this condition, the output pressure at output ports 318 and 326 is equal no matter how fast rotor 312 is driven. Effectively, there is no differential pressure that will be applied to the steering gear piston when no torque is applied by gear 360. This condition also illustrates the "limp home" mode where no assist is applied to the steering system in the event the EPAS controller or electrical system should fail. Ring cam 316 is balanced by both springs 322 and 324 as well as the balanced feedback in lines 325 and 327 to remain on center and not produce any differential in output fluid pressure.

In FIG. 3B, ring cam 316 is shown as being moved slightly right by clockwise directed torque applied by gear 360. Ring cam 316 pivots slightly counter-clockwise about pivot pin 321 and its center 302 moves to the right of pump rotor center 301. Assuming a clockwise rotation of pump rotor 312, the movement of ring cam 316 changes the configuration of pump chamber 323 so that the pressure of fluid at output port 326 is greater than the pressure of fluid of output port 318, as indicated by the "IN" and "OUT" arrows. When this occurs, right steering pressure "RP" is dominantly applied to actuation chamber 274, while a lesser pressure is applied to actuation chamber 272 which affects the assist applied to piston 280 (see FIG. 2). The differential pressure causes right steering to be assisted.

In FIG. 3C, ring cam 316 is shown as being moved slightly left by counter-clockwise directed torque applied by gear 360. Ring cam 316 pivots slightly clockwise about pivot pin 321 and its center 302 moves to the left of pump rotor center 301. Assuming a clockwise rotation of pump rotor 312, the movement of ring cam 316 changes the configuration of pump chamber 323 so that the pressure of fluid at output port 318 is greater than the pressure of fluid of output port 326, as indicated by the "IN" and "OUT" arrows. When this occurs, left steering pressure "LP" is dominantly applied to actuation chamber 272, while a lesser pressure is applied to actuation chamber 274 which affects the assist applied to piston 280 (see FIG. 2). The differential pressure causes left steering to be assisted.

As can be seen by the drawings and accompanying explanation, the present invention allows the advantages of a conventional EPAS system to be utilized in power assist steering systems that require significantly more power than is available in a strictly electrical system within conventional vehicles. While the embodiment shown here is the preferred embodiment, it shall not be considered to be a restriction on the scope of the claims set forth below.

I claim:

1. A power steering assist system for an automotive vehicle including:
    an over-center variable displacement hydraulic pump having a central rotor for rotation in a direction about a relatively fixed center of rotation, an adjustable cam with an inner wall that surrounds said central pump rotor providing space between said inner cam wall and said rotor to define a pair of variable pump chambers to differentially pressurize fluid in said chambers communicated to a pair of outlet ports connected to a steering gear apparatus;
    an electrical torque motor connected to apply torque forces to said adjustable cam;
    a control circuit configured to react to vehicle driver input and other vehicle data to provide an electrical signal to energize said electrical torque motor;
    said electrical torque motor reacting to said electrical signal to apply a desired amount of torque force to said cam; and
    said pump being sensitive to said applied torque force to adjust its output of differentially pressurized fluid communicated to said steering gear apparatus by a predetermined amount.

2. The power steering assist system of claim 1, wherein said inner wall of said adjustable cam is circular and said cam is pivotally mounted to allow the center of its inner circular wall to be moved over and to either side of said relatively fixed center of rotation of said rotor.

3. A power steering assist system for an automotive vehicle including:
    an over-center variable displacement hydraulic pump having an adjustable cam with an inner circular wall that surrounds a central rotor having a relatively fixed center of rotation and space between said inner cam wall and said rotor to define a variable pump chamber and said pump also having a pair of outlet ports connected to provide differentially pressurized fluid to a steering gear apparatus;
    a mechanism within said pump including said adjustable cam that is adjustable by applied torque forces to cause said pump to vary the differential pressure of said fluid output to said steering gear apparatus;

an electrical torque motor connected to said mechanism for applying torque forces to said adjustable cam;

a control circuit configured to react to vehicle driver input and other vehicle data to provide an electrical signal to activate said electrical torque motor;

said electrical torque motor reacting to said electrical signal to apply a desired amount of torque forces to said mechanism; and said pump being sensitive to said applied torque forces to adjust its output of differentially pressurized fluid to said steering gear apparatus by a predetermined amount;

wherein said adjustable cam is pivotally mounted to allow the center of its inner circular wall to be moved over and to either side of said relatively fixed center of rotation of said rotor; and wherein said mechanism further includes biasing springs in communication with opposite sides of said adjustable cam to cause said adjustable cam to be concentric with the center of rotation of said rotor when no torque is applied by said torque motor.

4. The power steering assist system of claim 3, wherein said steering apparatus includes a piston driven rack gear within a steering gear chamber and said differentially pressurized fluid is applied to opposing sides of said piston within said chamber.

5. The power steering assist system of claim 4, wherein said torque motor is connected to said adjustable cam by a reduction gear that causes said adjustable cam to be moved about its pivot point.

6. The power steering assist system of claim 3, further including a fixed displacement hydraulic pump for providing fluid supply for said variable displacement pump.

7. The power steering assist system of claim 6, wherein said fixed displacement and said variable displacement hydraulic pumps are each driven by the engine of said automotive vehicle.

8. The power steering assist system of claim 7, wherein said fixed displacement and said variable displacement hydraulic pumps are mounted to have their respective rotors on a common shaft.

9. The power steering assist system of claim 3, wherein said adjustable cam resides in an cam chamber that is separated into separate sections on either side of said adjustable cam and which are each in communication with one of said outlet ports and said differential pressure is reduced and fed back to each chamber section to provide resistance to forces applied to said adjustable cam by said torque motor.

10. A power steering assist system for an automotive vehicle including:

an electrical power assist control system which monitors data from said vehicle related to steering assist parameters and provides an electrical output signal correlated to a predetermined amount of desired steering assist;

an electric motor connected to said control system for outputting a rotational torque force having a value corresponding to the signal output of said control system;

a hydraulic amplifier connected between said motor and the steering system of said vehicle for applying fluid under a differential pressure to a steering gear in said steering system in proportion and greater than said torque forces applied by said motor, wherein said hydraulic amplifier comprises an over-center variable displacement hydraulic pump having an adjustable cam surrounding a central rotor to define a variable pump chamber.

11. The power steering assist system of claim 10, wherein said electric motor communicates said rotational torque to said adjustable cam to effect the differential output applied to said steering gear.

12. The power steering assist system of claim 11 wherein said steering gear includes a piston driven rack gear within a steering gear chamber and said differentially pressurized fluid is applied to opposing sides of said piston within said chamber.

13. A power steering assist system for use in an automotive vehicle comprising:

an over-center variable displacement hydraulic pump having an adjustable cam surrounding a central rotor to define a pair of variable pump chambers to differentially pressurize fluid in said chambers communicating with first and second output lines which are connected to a steering gear and being controllable to provide fluid at differential pressure to said steering gear through said first and second output lines;

an electric motor connected to said hydraulic pump for applying torque to control the differential pressure output by said pump to said first and second output lines; and an control circuit for activating said electric motor in accordance with steering data from said vehicle.

14. The power steering assist system of claim 13, further including a fixed displacement hydraulic pump for providing fluid supply for said variable displacement pump.

15. The power steering assist system of claim 14, wherein said fixed displacement and said variable displacement hydraulic pumps are each driven from a common shaft.

* * * * *